United States Patent
Bratthall et al.

(12) 
(10) Patent No.: US 6,345,928 B2
(45) Date of Patent: *Feb. 12, 2002

(54) CLAMPING SPRING RING

(75) Inventors: Johan Bratthall, Saltsjo-Boo; Borje Stahl, Kista; Lars Ogren, Taby, all of (SE)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,271

(22) Filed: Dec. 7, 1999

(30) Foreign Application Priority Data

Dec. 23, 1998 (SE) .............................. 9804525-5

(51) Int. Cl.⁷ ................................. F16L 39/01
(52) U.S. Cl. ...................... 403/326; 403/327; 285/318
(58) Field of Search ............................ 417/423.14, 420, 417/423.12; 403/326, 327, 328, 286; 285/318

(56) References Cited

U.S. PATENT DOCUMENTS

| 3,218,095 A | * | 11/1965 | Wiltse | 285/318 |
| 3,712,647 A | * | 1/1973 | Stecher | 285/318 |
| 5,411,348 A | * | 5/1995 | Balsells | 403/326 |

* cited by examiner

Primary Examiner—Lynne H. Browne
Assistant Examiner—John R. Cottingham
(74) Attorney, Agent, or Firm—Menotti J. Lombardi

(57) ABSTRACT

The invention concerns a device for mutual locking of two concentric cylindrical parts such as parts to be used in a submersible pump unit. One outer part (10) and two inner parts (6) and (7) are locked mutually by help of a circumferential locking element (12) having resilient abilities and which is arranged at the intersectional point between the three parts (6), (7) and (10).

6 Claims, 2 Drawing Sheets

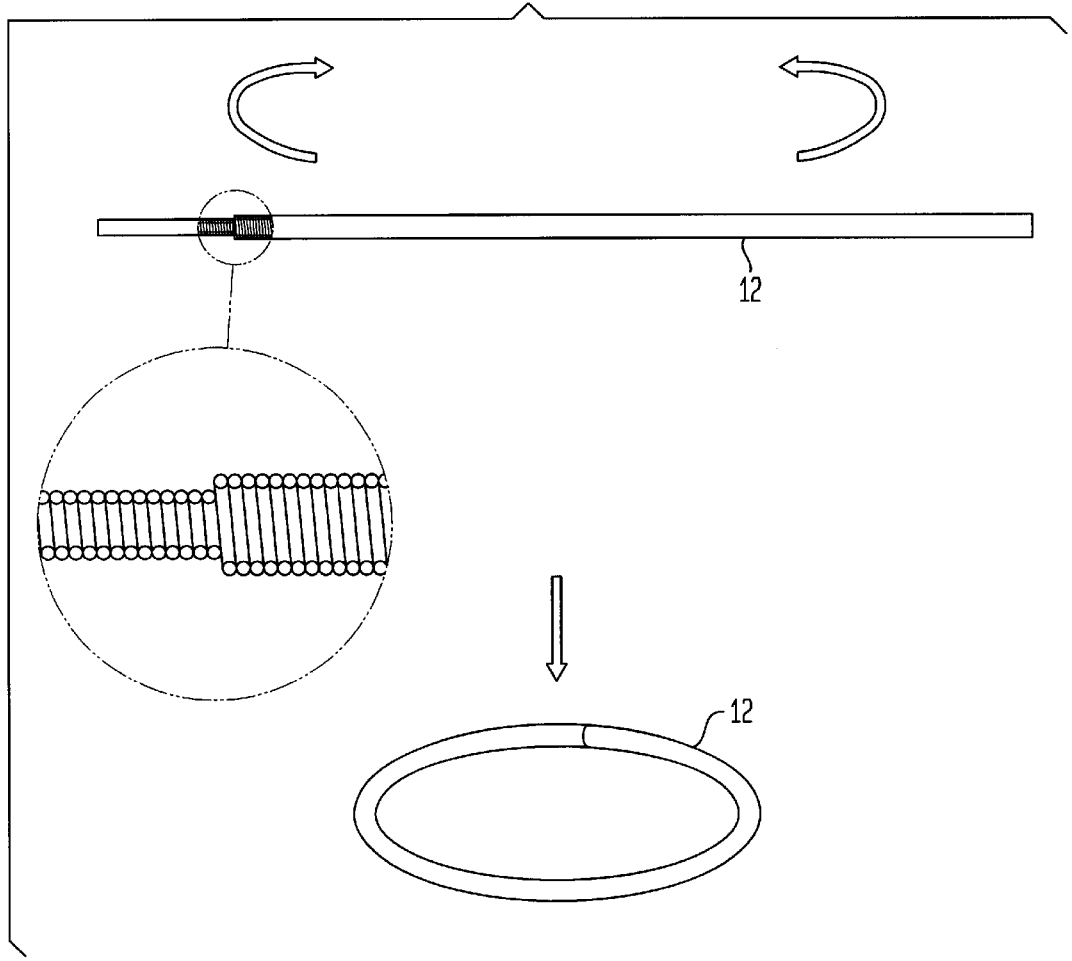

CLAMPING SPRING RING

FIELD OF THE INVENTION

The invention concerns a device for mutual locking of concentric cylindrical parts such as parts in a submersible pump unit.

BACKGROUND OF THE INVENTION

A submersible pump unit normally includes an electrically driven motor and a hydraulic unit with a rotating impeller connected to the motor via a rotary driving shaft.

In order to prevent the medium within the hydraulic unit from penetrating the motor along the driving shaft, one or two seals are normally arranged between the motor and the hydraulic unit. A common type of seal is the so-called mechanical face seal, which includes one seal ring rotating with the shaft and one stationary seal ring attached to the surrounding housing. The two seal rings are pressed against each other by a spring, thus preventing medium from entering between the seal surfaces.

A pump unit of the above mentioned type will thus include an electric motor, a seal housing and a hydraulic unit with an impeller connected to the motor via a central rotary shaft.

In order to keep the different parts together into one unit there are several solutions. Big machines are normally kept together by help of flanges provided with a number of bolts along their circumferences. Smaller machines may be connected by help of long bolts around the periphery which bolts press the outer parts towards each other, thus locking the intermediate part therebetween.

Examples of such solutions are shown in SE-415 696 and DE-1 653 726.

A disadvantage with these known solutions is that they are relatively expensive because of costly materials and because of the fact that the mounting time could be extensive. The problem to be solved is thus to obtain a slim design without any outer details which add to its diameter.

A device for obtaining an axial locking between concentric details is disclosed in SE-399 745. An element 6 is here arranged within grooves in the concentric details thus establishing an axial mutual locking. A disadvantage however, is that said element 6 is rigid, which means that the concentric details are not allowed to come into contact with each other. The result will be that the mutual location of the details is not defined, but may vary depending on the dimension of the element 6. In addition there is no locking against mutual rotation.

SUMMARY OF THE INVENTION

A device for mutual axial and radial locking of an outer detail and two adjacent internal details, comprises a ring-shape locking spring element and a circumferentially formed channel disposed at an intersection between the outer detail and the internal details. The locking spring element is compressed in the channel.

BRIEF DESCRIPTION OF THE DRAWINGS

The invention is described in more detail below with reference to the enclosed drawings wherein:

FIG. 2 is a perspective view of a locking coil spring.

DETAILED DESCRIPTION OF THE INVENTION

Figure 1:
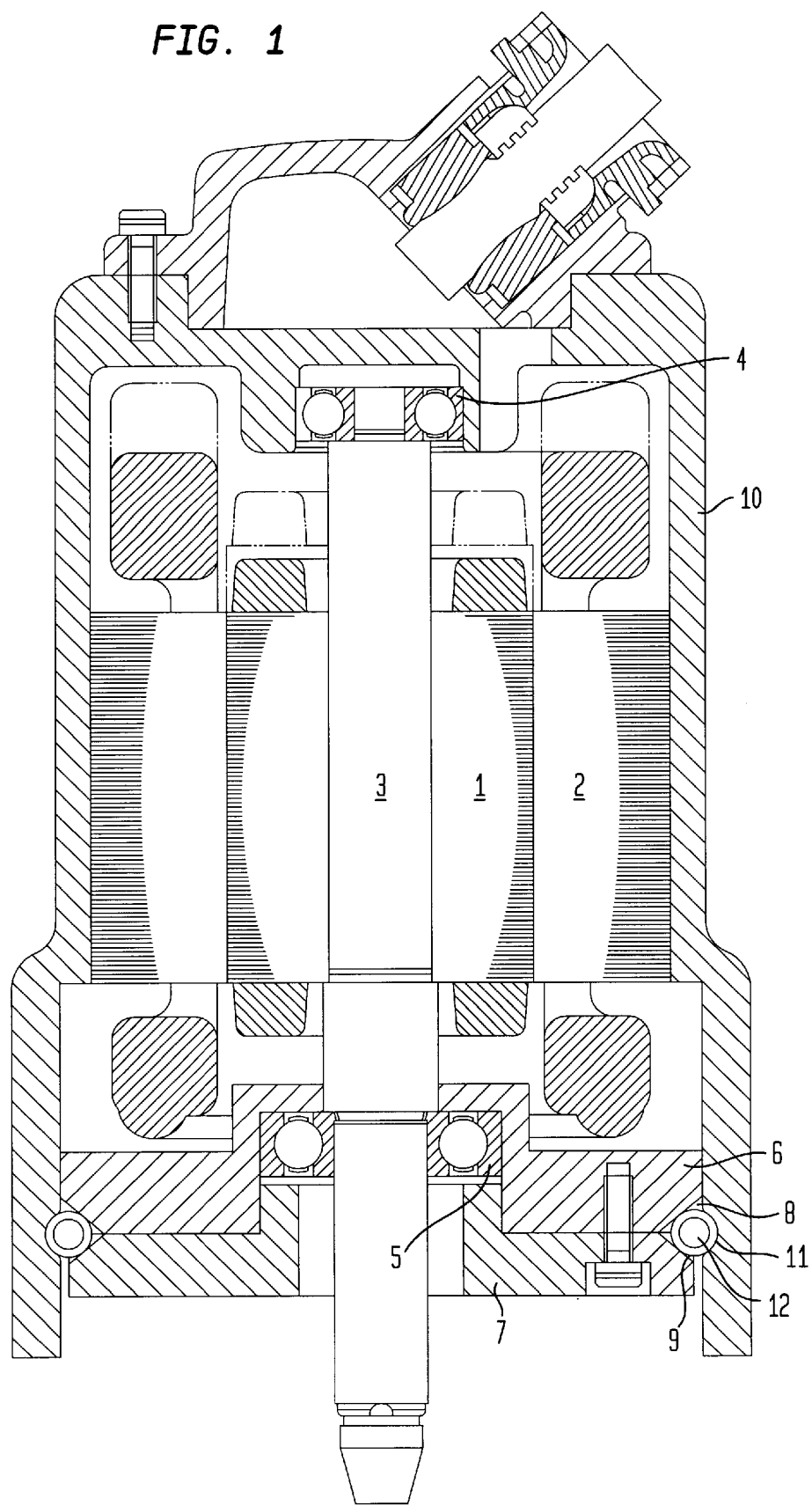
FIG. 1 is a sectional view through a pump according to the invention.

In FIG. 1, numerals 1 and 2 identify the rotor and the stator respectively in an electric motor, numeral 3 identifies a driving shaft, numerals 4 and 5 identify bearings, numeral 6 identifies a bearing housing or other cylindrical internal detail having an outer diameter, numeral 7 identifies a bearing cover or other cylindrical internal detail having an outer diameter, numerals 8 and 9 identify chamfers on the peripheries of the bearing housing 6 and the bearing cover 7 respectively. Numeral 10 identifies a capsule or other cylindrical outer detail having an inner diameter and surrounding the stator 2, numeral 11 identifies an internal groove in the capsule 10 and numeral 12 identifies a locking coil spring. FIG. 2 shows the spring 12 in straight and united configurations.

The machine thus comprises an electric driving unit consisting of a rotor 1 and a stator 2. A driving shaft 3 is supported in an upper bearing 4 and a lower bearing 5 respectively, said lower bearing being mounted in a bearing housing 6 having a cover 7. The machine also comprises a seal housing and a pump housing with an impeller connected to the lower end of the driving shaft 3.

The driving shaft 3 is subject to strong axial forces during operation and it is thus very important that it is correctly locked axially in relation to the stator 2. According to the invention, the lower bearing 5 is supported in a housing 6 which locks the bearing and prevents it from being moved upwardly or to the side. The bearing housing 6 is further provided with a collar, the periphery of which extends out to the stator capsule 10. The bearing is locked to the housing by a cover 8 which is pressed against the underside of the bearing and is fixed to the bearing housing by screws. The periphery of the cover 7 having the same diameter as the collar on the bearing housing.

According to the invention the lower bearing 5 is fixed in the bearing housing 6 in the capsule 10 by help of a special design. According to a preferred embodiment the capsule 10 is being provided with an internal circumferential groove 11. The peripheries of the collar on the bearing housing as well as the cover 7 are provided with chamfers 8 and 9 respectively. These create together a ring formed channel on the inside of the capsule. This channel is utilized for mutual locking of the details in the following way:

When the details are mounted the bearing housing 6 is slid onto the shaft 3 into a position decided by a shoulder on the shaft. The periphery of the collar on the bearing housing will then be positioned opposite the groove 11 in the capsule 10. In the ring formed channel or channels established between the groove 11 and the chamfer 8 on the periphery of the collar, a locking coil spring 12, having an elastically deformable cross section, is mounted. Said spring being preferably designed like a spiral spring with its ends being united thus forming a ring with a diameter mainly the same as that of the inner wall of the capsule 10. The dimension of the spring 12 being such that it can be accommodated within the channel or channels.

The bearing 5 is then slid onto the shaft and mounted in the bearing housing 6 and the the cover 7 is pressed into alignment with the underside of the bearing and attached to the bearing housing by help of axial screws. The chamfer 9 on the periphery of the cover 7 the closes the ring formed channel where the spring 12 has been inserted. Said spring, the dimension of which being such that it fills up the channel, then obtains an effective mutual axial as well as radial locking of the bearing housing and the capsule 10 and consequently also an axial locking of the bearing and the shaft. The capsule 10 in its turn being pressed around the stator 2 which means that a well connected package is obtained.

A condition for obtaining a sufficient strength of the joint, without the demand for extreme manufacturing tolerances, is that the detail used in the channel must be resilient, but at the same time sufficiently rigid. A correctly dimensioned spiral spring is then a perfect solution. By choosing a suitable relationship between compressing strain and the spring constant in the locking spring, a butt contact between the bearing housing 6 and the bearing cover 7 is secured over a a certain tolerance range. A rigid ring such as a lock ring, demands very high tolerances and an o-ring is too flexible to obtain a sufficient strength when the joint is subject to high stress. A rigid ring having a coating of resilient material could be used and is within the scope of the invention.

In the description above and in the enclosed drawing the preferred embodiment is described as a mutual locking between a bearing housing and a surrounding stator capsule in a submersible pump. The invention is however not limited to this field, but possible to apply in general for mutual locking of concentric details.

Other embodiments within the scope of the invention can be a division of the groove 11 into several parts. Further variants are that only one of the parts bearing housing or bearing cover is provided with a chamfer 8 or 9, or that the room for accommodation of the coil spring is established by the groove 11 only. According to still another alternative, the groove is eliminated and the room for the coil spring is established by one or two chamfers on the bearing house and/or the bearing cover.

What is claimed is:

1. A device comprising:

an outer detail having an inner diameter;

internal details adjacent the outer detail, the internal details each having an outer diameter which equals the inner diameter of the outer detail;

the outer detail and the internal details defining a circumferential channel at an intersection thereof; and a ring-shape locking spring element compressed in the channel.

2. The device according to claim 1, wherein the outer detail is a stator housing in an electric motor and the internal details are a bearing housing and a bearing cover respectively, the cover being attached to the bearing housing, the housing as well as the cover being provided with collars which extend outwards to the stator housing.

3. The device according to claim 1, wherein the outer detail is provided with at least a section of an internal groove which defines at least a portion of the channel and accommodates the spring element at the intersection of the outer detail and the internal details.

4. The device according to claim 1, wherein at least one of the internal details is provided with a chamfer which defines at least a portion of the channel and accommodates the spring element at the intersection of the outer detail and the internal details.

5. The device according to claim 1, wherein the internal details are each provided with a chamfer, the chamfers facing each other and defining at least a portion of the channel, the chamfers operative for accommodating the spring element at the intersection of the outer detail and the internal details.

6. The device according to claim 1, wherein the spring element comprises a ring-shape spiral spring having a diameter corresponding with a cross section of the channel at the intersection of the outer detail and the internal details, the spiral spring having a diameter corresponding with the inner diameter of the outer detail.

* * * * *